United States Patent [19]

Shimoyama et al.

[11] Patent Number: 4,542,406
[45] Date of Patent: Sep. 17, 1985

[54] VIDEO/AUDIO SIMULTANEOUS TRANSMISSION SYSTEM

[75] Inventors: Haruo Shimoyama; Toshio Ohshima; Shinobu Nomoto; Makoto Hiraoka, all of Tokyo; Toshio Hanabata, Yokohama, all of Japan

[73] Assignees: Nippon Electric Co., Ltd.; Nippon Telegraph & Telephone Public Corporation, both of Tokyo; Fujitsu Limited, Kawasaki, all of Japan

[21] Appl. No.: 447,653

[22] Filed: Dec. 7, 1982

[30] Foreign Application Priority Data

Dec. 10, 1981 [JP] Japan ................................. 56-199099

[51] Int. Cl.[4] ............................................... H04N 7/04
[52] U.S. Cl. .................................... 358/141; 358/142; 358/143; 358/146
[58] Field of Search ............... 358/141, 143, 146, 142, 358/148, 314, 319, 343; 328/187; 360/19.1

[56] References Cited

U.S. PATENT DOCUMENTS 3,755,624 8/1973 Sekimoto .......................... 358/148

FOREIGN PATENT DOCUMENTS 57-31277 2/1982 Japan.

Primary Examiner—Tommy P. Chin
Assistant Examiner—Michael D. Parker
Attorney, Agent, or Firm—Blakely, Sokoloff, Taylor & Zafman

[57] ABSTRACT

The horizontal sync signal contained in the video signal from a video apparatus sometimes undergoes phase jump, resulting in failure of multiplexing of audio and video signals based on the horizontal sync signal. A sync signal switching circuit is adapted to produce a modified sync signal by switching the sync signal to a local sync signal upon occurrence of the phase jump, thereby assuring the multiplexing of audio and video signals.

3 Claims, 10 Drawing Figures

VIDEO/AUDIO SIMULTANEOUS TRANSMISSION SYSTEM

BACKGROUND OF THE INVENTION

This invention relates to a video/audio simultaneous transmission system and, more particularly, to a video/audio simultaneous transmission system which can encode a video signal including horizontal sync signal occurring at indefinite time intervals and an audio signals and transmit these encoded signals.

In a video/audio simultaneous transmission system in which a video signal and an accompanying audio signal are transmitted through the same transmission channel, one type has hitherto been used in which each time a horizontal sync signal occurs in the video signal, a special code word for word synchronization is transmitted and encoded audio and video data are successively transmitted subsequent to the special code word in order that even such a video signal of comparatively low sync frequency stability as transmitted from a video apparatus, for instance, a cassette video tape recorder (hereinafter referred to as VTR) may be transmitted. Such a prior art video/audio simultaneous transmission system is disclosed in Japanese Patent Preliminary Publication No. 31277/82.

According to the prior art video/audio simultaneous transmission system, the encoding of the video signal is suspended for a predetermined period in the horizontal retrace period, and during this time period the special code word and encoded audio data are transmitted, whereby even in a case of such a video signal of low sync frequency stability as from a video apparatus, for example, a VTR, the audio signal can be transmitted simultaneously without affecting the video signal at all. Also, the word synchronization can be readily established on the receiving side by extracting the special code word.

In the prior art video/audio simultaneous transmission system, however, in order for the audio signal to be sampled at a predetermined sampling frequency for encoding and simultaneous transmission even when a dropout or large phase jump occurs in the horizontal sync signal of the input video signal, the scale of the hardware must be greatly increased. For example, if a drop-out occurs in the horizontal sync signal in the video signal, the encoded audio data obtained during a plurality of horizontal scanning periods has to be temporarily stored in a buffer memory and successively sent out each time following horizontal sync signals occur. To this end, a buffer memory and a control circuit, these being of considerably large scales, must be added. Therefore, with the prior art video/audio simultaneous transmission system the scale and complexity of the hardware are greatly influenced by the degree of the horizontal sync frequency stability permitted for the input video signal; particularly, where it is inevitable to allow low horizontal sync frequency stability for the input video signal, it is impossible to obtain simple and stable video/audio simultaneous transmission.

SUMMARY OF THE INVENTION

An object of the invention is to provide a video/audio simultaneous transmission system which can overcome the drawbacks noted above and permits stable and accurate simultaneous transmission of audio signals without resort to extreme increase of the scale and complexity of hardware even with a video signal which is subject to partial drop-out or large phase jump of the horizontal sync signal.

According to the invention, there is provided a video/audio simultaneous transmission system comprising:

means for sampling and encoding a video signal inclusive of horizontal sync signals occurring at indefinite time intervals in response to a first clock signal having a recurrence period independent of the recurrence period of the horizontal sync signal;

means for sampling and encoding an audio signal in response to a second clock signal having a predetermined recurrence period;

means for generating a sync signal in response to the horizontal sync signal;

means for modifying the sync signal to produce a modified sync signal on the basis of said first clock signal; and means responsive to a third clock signal each time it receives the modified sync signal, for transmitting a special code different from the codes of the encoded audio and video signal data and thereafter the encoded audio and video signals successively.

DESCRIPTION OF PREFERRED EMBODIMENT

Figure 1:
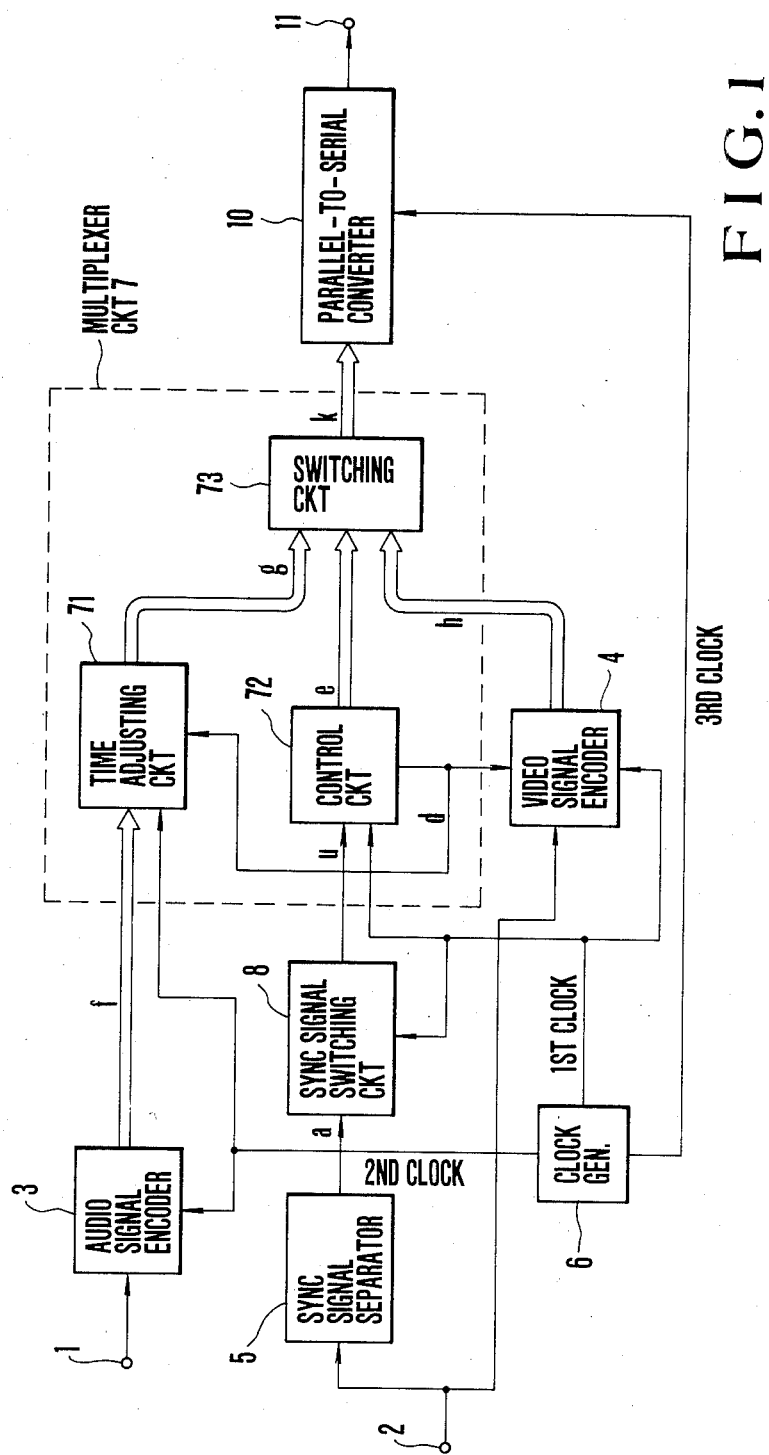
FIG. 1 is a block diagram showing a video/audio simultaneous transmission system according to the invention.

Referring now to FIG. 1, there is shown a video/audio simultaneous transmission system embodying the invention.

In the figure, an audio signal is supplied from an input terminal 1 to an audio signal encoder 3, while a video signal is supplied from an input terminal 2 to a sync signal separator 5 and also to a video signal encoder 4. A clock generator 6 provides an audio sampling clock signal (a second clock), which is supplied to the audio signal encoder 3 and also to a time adjusting circuit 71 in a multiplexer circuit 7. The clock generator 6 also provides a video sampling clock signal (a first clock), which is supplied to the video signal encoder 4 and also to a control circuit 72 in the multiplexer circuit 7. The audio signal encoder 3 samples the audio signal under the control of the audio sampling clock signal and encodes the sampled audio signal. The encoded audio signal data thus obtained is supplied as a signal f to the time adjusting circuit 71 of the multiplexer circuit 7. The video signal encoder 4 samples the video signal under the control of the video sampling clock signal and encodes the sampled video signal. The encoded video signal data thus obtained is supplied as a signal h to a switching circuit 73 in the multiplexer circuit 7. The sync signal separator 5 separates the horizontal sync signal contained in the video signal and supplies it as a sync signal a to a sync signal switching circuit 8, which in turn connected to the control circuit 72 in the multiplexer 7 to supply the same with a signal u. The multiplexer 7, which receives the individual signals noted above, successively supplies a special code word for word synchronization and encoded audio and video data to a parallel-to-serial converter 10 as will be described later in detail.

Assuming now that the sync signal switching circuit 8 is omitted and the separator 5 is directly coupled to control circuit 72 as in the prior art mentioned above, when a signal representing the commencement of the horizontal sync signal appears in the signal a (hereinafter referred to a sync signal), the control circuit 72 in the multiplexer 7 now receiving the sync signal a instead of the signal u (modified sync signal) supplies a signal d indicative of suspension of the encoding of the video signal to the time adjusting circuit 71 and video signal encoder 4 and also supplies a signal b which contains a signal indicative of the sending of special code word and a special code word, to the switching circuit 73. When the time adjusting circuit 71 receives the signal d indicative of the suspension of the encoding of the video signal, it supplies an encoded audio data having been received within a time interval between the occurrence of the preceding video encoding suspension signal and the occurrence of the instant signal d as a signal g to the switching circuit 73. When the video encoder 4 receives the video encoding suspension signal d, it stops the encoding of the video signal or stops the sending of the signal h. The switching circuit 73 includes a switch group for switching the signal g, signal h and special code word. When the switching circuit 73 receives the signal e, it supplies the special code word and thereafter the encoded audio data during the period of presence of the signal indicative of the suspension of the encoding of the video signal. When the video signal encoding suspension signal vanishes, the switching circuit 73 then supplies the encoded video data. The multiplexer circuit 7 thus supplies the special code word and encoded audio and video data successively as a signal k. The parallel-to-serial converter 10 receives the signal k, which is a parallel signal, and converts it into a serial signal under the control of a transmission channel clock signal (a third clock) fed from the clock generator 6. The serial signal thus obtained is sent out from an output terminal 11.

Figure 2A:
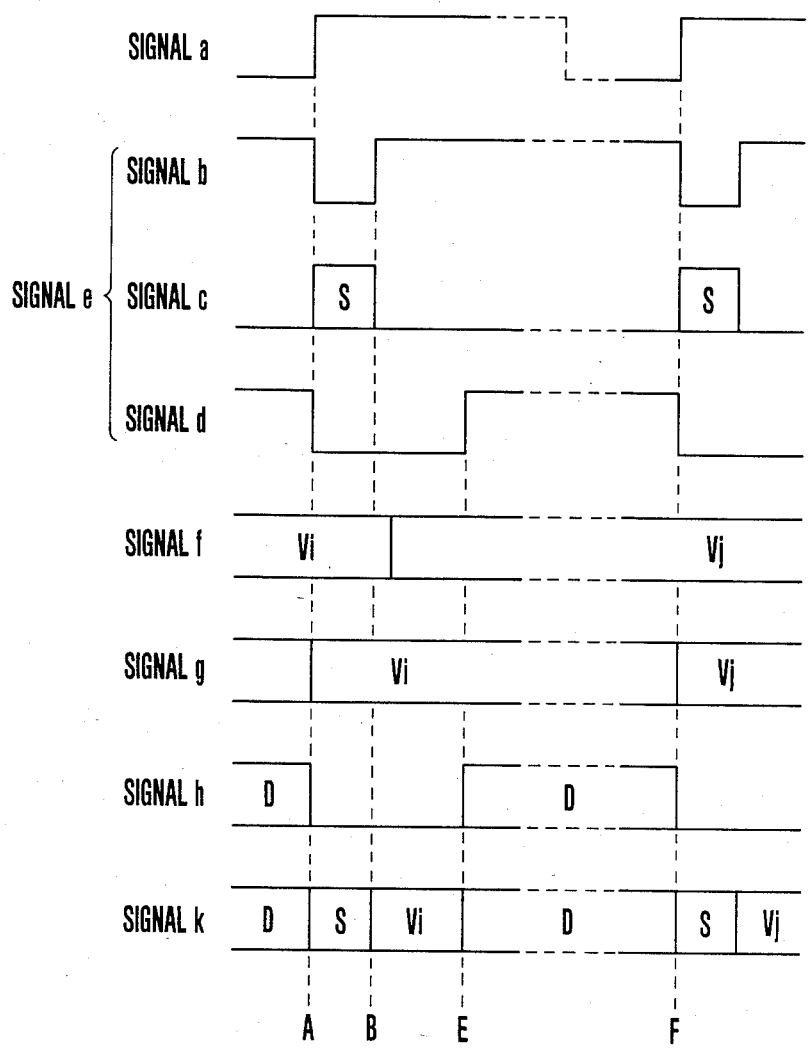
FIGS. 2A and 2B show signal waveforms useful in explaining the operation of the system on the assumption that a sync signal switching circuit is omitted.
Figure 2B:

FIG. 2A shows an example of signals appearing at various points in the system of FIG. 1. At an instant A (or F), at which a horizontal sync signal corresponding to an encircled portion in the video signal as shown in FIG. 2B appears, a pulse of the sync signal a rises, indicating the commencement of the horizontal sync signal. Without the sync signal switching circuit 8, when the control circuit 72 in FIG. 1 receives the sync signal a, it supplies a pulse signal b, which falls at the instant A and rises again at an instant B after the lapse of a predetermined period. The control circuit 72 also supplies a pulse signal d, which falls at the instant A and rises again at an instant E after the lapse of a predetermined period. Further, the control circuit 72 supplies a signal c containing a special code word S during a period from the instant A till the instant B. As mentioned earlier, the signal d is supplied to the video encoder 4 and also to the time adjusting circuit 71 in FIG. 1, and the signal e which contains the parallel signals b, c and d is supplied to the switching circuit 73 in FIG. 1. The special code word S has a code pattern, the use of which is inhibited in the encoded audio and video data, and it is used for establishing word synchronization. When the time adjusting circuit in FIG. 1 receives the signal d, it supplies a signal f, which consists of an encoded audio data Vi that has been supplied from the audio encoder 3 between the instant A at which the pulse d falls and an instant at which a preceding pulses d rises, as a multiplexed signal g during a period from the instant A till an instant F. In case when the encoded audio data within the same audio sampling clock period occurs both in the encoded audio data Vi from the instant A till the instant F and in an ensuing encoded audio data Vj from the instant F, a predetermined dummy code is provided in lieu of the latter encoded audio data. When the video encoder 4 receives the signal d, it supplies encoded video data D as a signal h for a period from the rising till the falling of the pulse of the signal d. In the switching circuit 73, the switch group is switched according to the signals b and c contained in the signal e. The switching circuit 73 supplies as the signal k the special code word S for a period from the instant A till the instant B, the encoded audio data Vi for a period from the instant B till the instant E and the encoded video data D for a period from the instant E till the instant F. The signal k is supplied as a parallel signal having a predetermined number of bits to the parallel-to-serial converter 10 in FIG. 1 for conversion into a serial signal, which is sent out of the output terminal 11.

Figure 3:
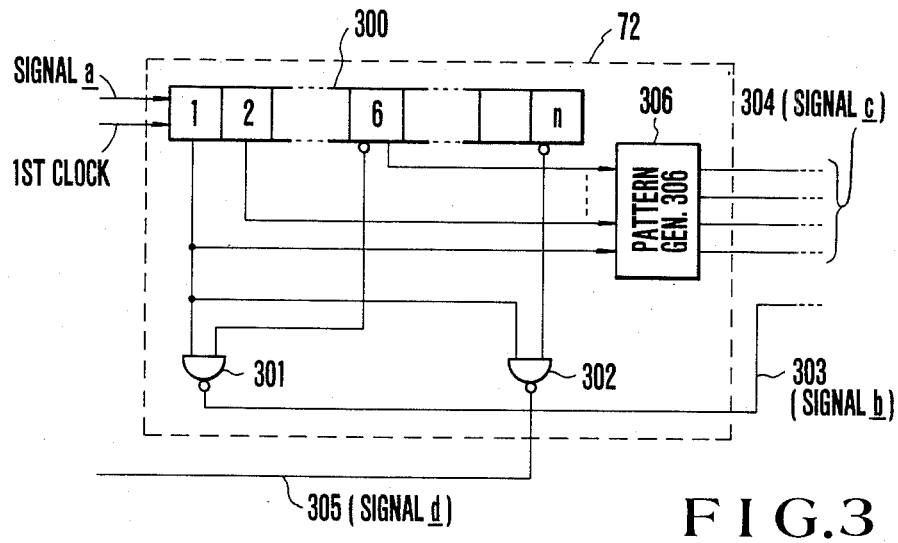
FIG. 3 shows details of a control circuit of the system.
Figure 4:
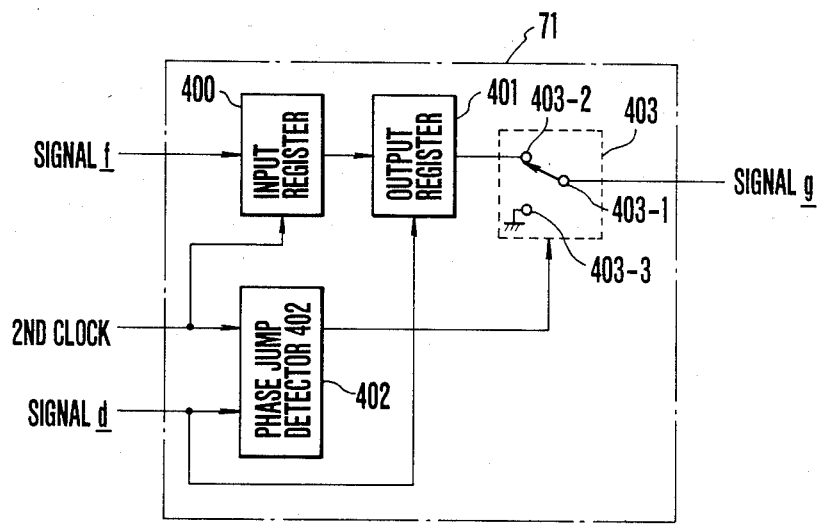
FIG. 4 is a block diagram of a time adjusting circuit of the system.
Figure 5:
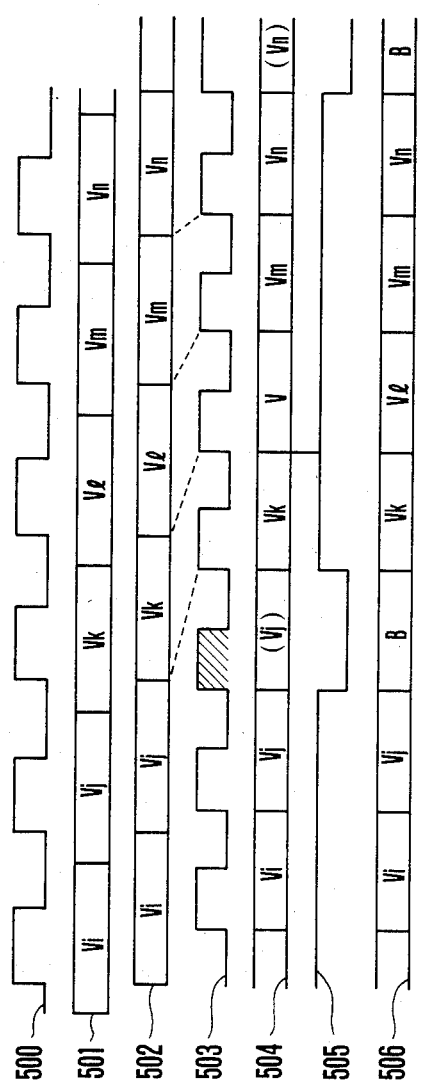
FIG. 5 is a time chart for explaining the operation of the time adjusting circuit.
Figure 6:
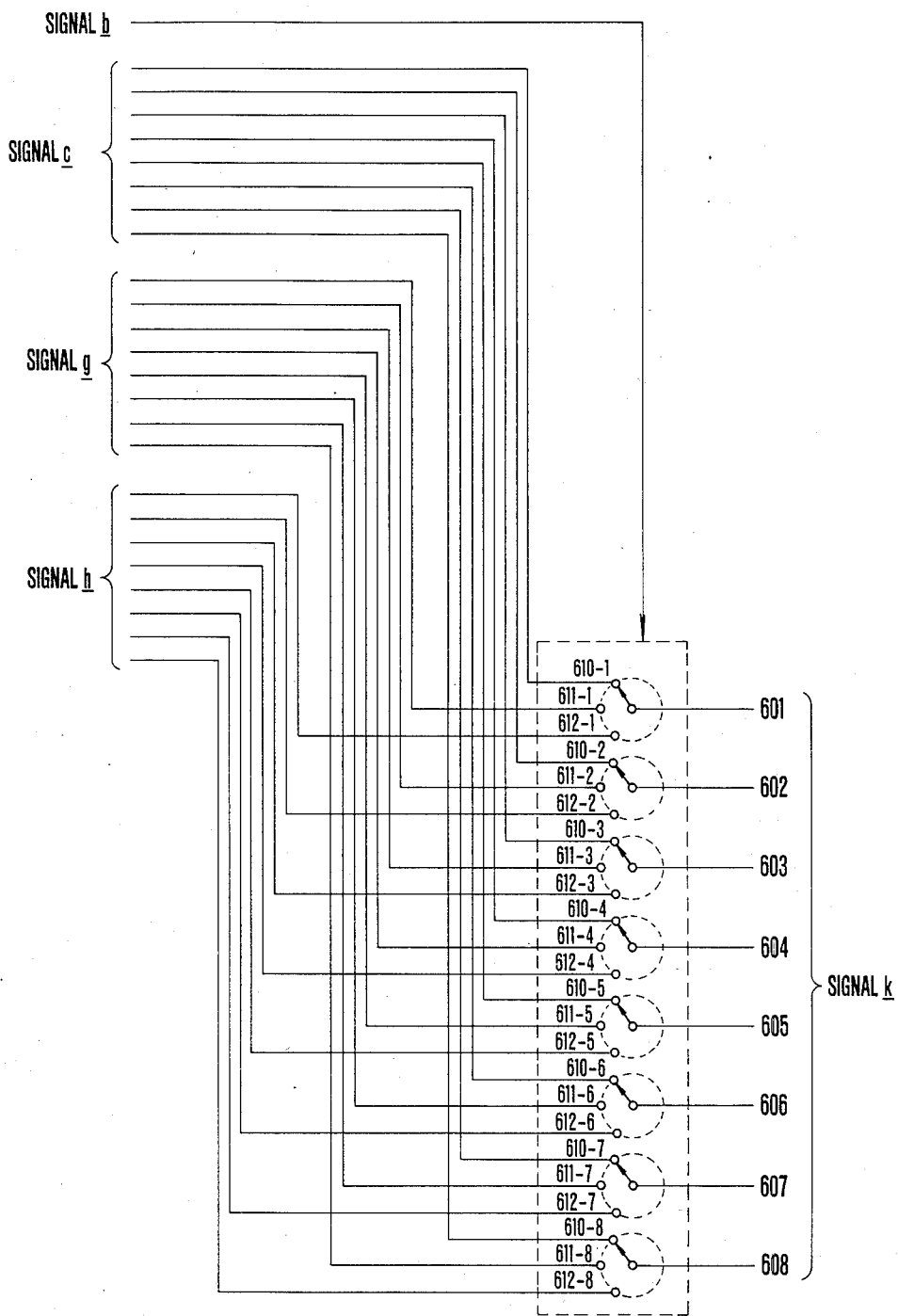
FIG. 6 shows details of a switching circuit of the system.

In the system of FIG. 1, the audio signal encoder 3 may be constituted by an ordinary A/D converter, and the video signal encoder 4 by a DPCM (difference PCM) encoder. The control circuit 72 may be constructed as shown in FIG. 3. More particularly, the sync signal a indicaive of the commencement of the horizontal sync signal is read into a shift register 300 under the control of the first clock. Through two NAND gates 301 and 302, the signal b indicative of the generation of the special code is sent onto a line 303 and the suspension signal d is sent onto a line 305. If the number of bits sent out during one sampling period is 8, the special code in the form of 8-bit parallel code will be produced from a pattern generator 306 which is controlled by tap outputs from the first to sixth stages of the shift register 300. The time adjusting circuit 71 may have a construction as shown in FIG. 4 which operates in accordance with signals shown in FIG. 5. The encoded audio data f (in the form of 8 bits, for example) as shown at 501 in FIG. 5 is written into an input register 400 under the control of the second clock as shown at 500 in FIG. 5. An output signal as shown at 502 in FIG. 5 is fed to an output register 401 in response to the suspension signal d as shown at 503 in FIG. 5, thereby being brought into synchronization with the timing for the special code. In this synchronization, a phase jump will occur as shown by a hatched pulse in the suspension signal 503, which phase jump may be corrected by transmission of a specified dummy code. The phase jump can be detected at a phase jump detector 402 by sampling the second clock 500 on the basis of the suspension signal 503. When the phase jump is detected, a dummy code insertion designating pulse 505 is produced from the detector 402 to control a signal switching circuit 403. In this switching circuit, a movable contact 403-1 is normally transferred to a stationary contact 403-2 to pass the encoded audio signal from the output register 401 which is synchronized with the timing for the special code, and at an instant at which the dummy code insertion designating pulse occurs, the movable contact 403-1 is transferred to a stationary contact 403-3 to ensure that a specified dummy code (phase jump information) can be inserted. The switching circuit 73 may be constructed as shown in FIG. 6. Respective output lines 601 to 608 are connected to 1 out of 3 selectors which select one input out of three inputs. Normally, contacts 612-1 to 612-8 are selected so that 8 bits of the encoded video signal h are successively sent to the output lines 601 to 608.

When signal b is in its low level, contacts 610-1 to 610-8 are sequentially selected to send out "1111", "0000", "0000", "0000", "0000" and "1111". After signal b resumes its high level and while signal d is in its low level, contacts 611-1 to 611-8 are selected so that 8 bits of voice signal g are successively sent to the output lines 601 to 608. After 8 bits of the encoded audio signal have been sent out, the switching circuit 73 returns to the normal operation in which the contacts 612-1 to 612-8 are selected.

In the foregoing description, the system of FIG. 1 has been described on the assumption that the sync signal switching circuit 8 is omitted. When the sync signal switching circuit 8 is added, it receives the sync signal a from the sync signal separator 5 and also receives the video sampling clock signal from the clock generator 6 to thereby produce a local sync signal and a time window signal. Thus, the sync signal switching circuit 8 decides whether the signal that appears first in a predetermined period of time is the sync signal a or the local sync signal, and supplies the signal that appears first as the modified sync signal u to the control circuit 72 in the multiplexer 7.

Figure 7:
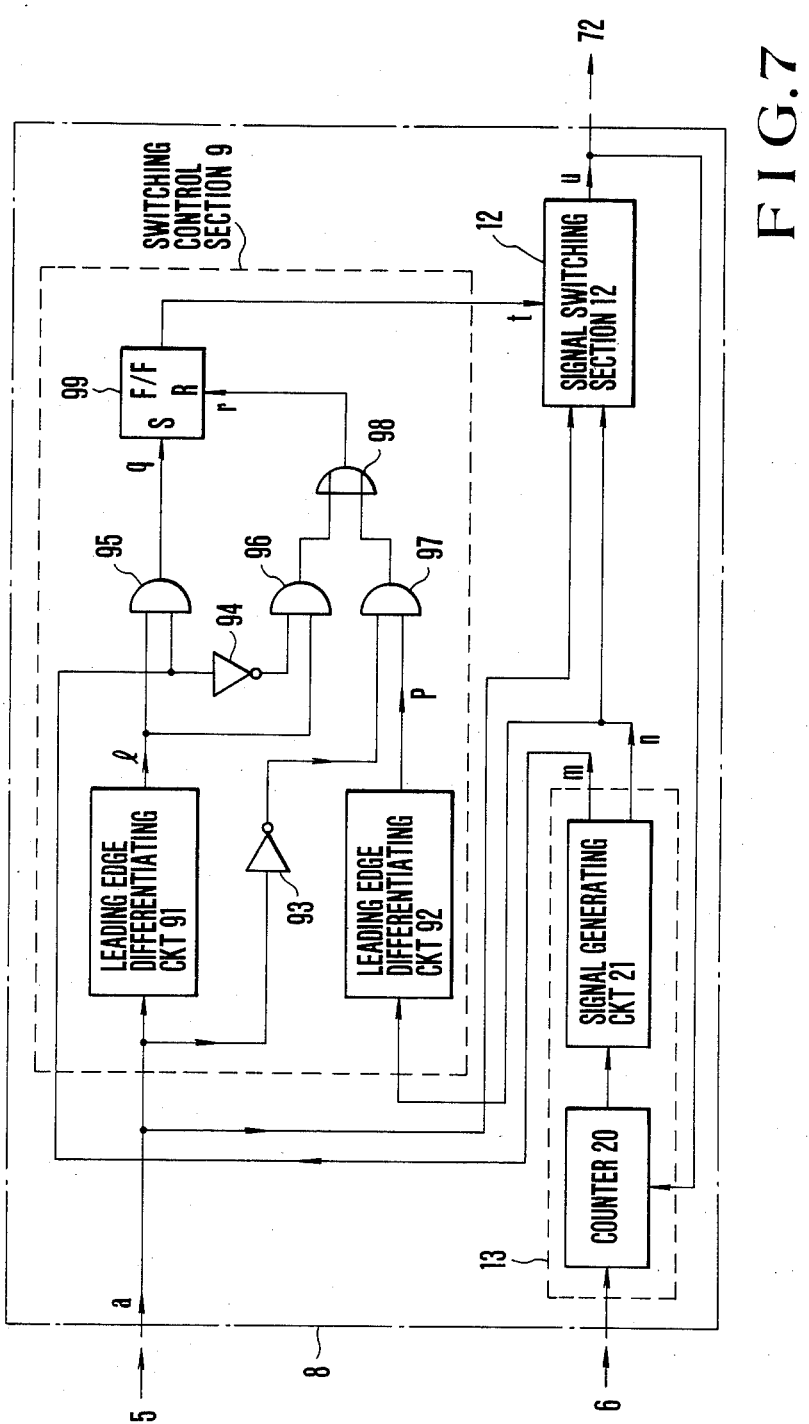
FIG. 7 is a block diagram showing one embodiment of the sync signal switching circuit.

FIG. 7 is a block diagram showing the sync signal switching circuit 8. The sync signal a supplied from the sync signal separator 5 passes through a leading edge differntiating circuit 91 in a switching control section 9 and is supplied as a signal l to AND gates 95 and 96. The signal a is also supplied through a "not" gate 93 to an AND gate 97. In a signal generating section 13, a counter 20 counts clock pulses of the video sampling clock signal supplied from the clock generator 6, and its count is supplied to a signal generating circuit 21. The signal generating circuit 21 includes a read only memory (ROM) and a register. In response to the count data supplied from the counter 20, data stored in a location of the ROM corresponding to the count is read out into the register, whereby signals m and n are provided. The signals m and n are respectively a time window signal and a local sync signal. The signal m is fed to the AND gate 95 in the switching section 9 and is also fed through a "not" gate 94 to the AND gate 96. The signal n is passed through a leading edge differentiating circuit 92 in the switching control section 9 to be supplied as a signal p to the AND gate 97. A signal q provided from the AND gate 95 is fed as a set input to a flip-flop 99. Signals provided from the AND gates 96 and 97 are passed through an OR gate 98 to be fed as a reset signal r to the flip-flop 99. A signal t is supplied from the flip-flop 99 to a signal switching section 12. The signal switching section 12 receives the signals a and n, and in response to the signal t it supplies either signal a or n as a modified sync signal u to the control circuit 72 in the multiplexer 7 shown in FIG. 1. The modified sync signal u is also supplied as a reset signal to the couner 20.

Figure 8:
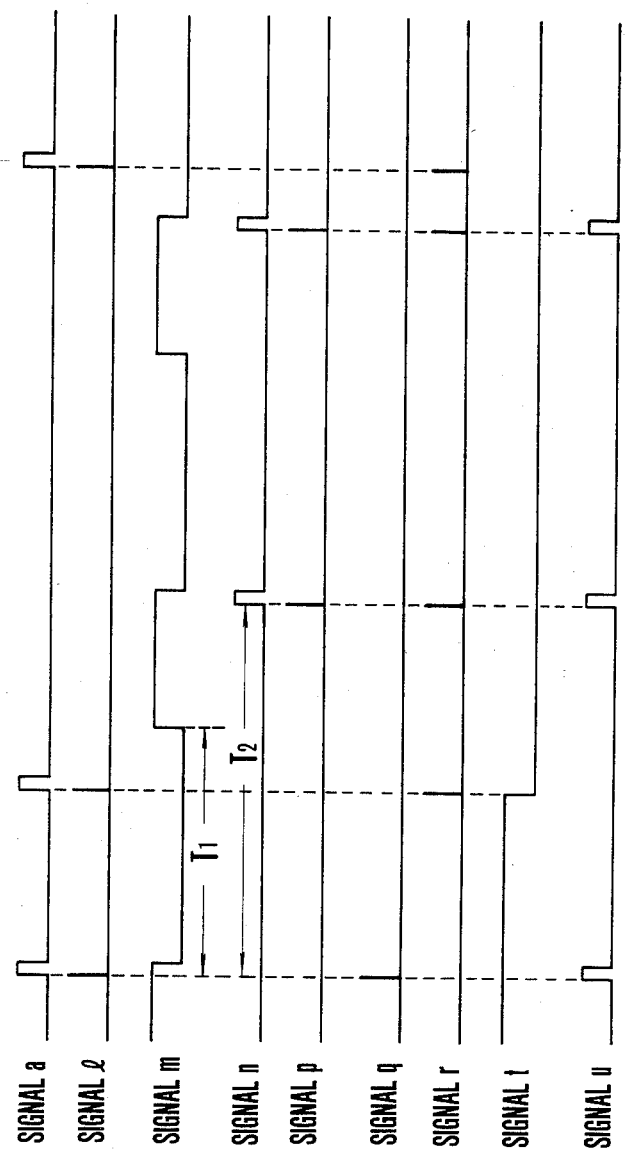
FIG. 8 shows signal waveforms useful in explaining the operation of the sync signal switching circuit.

FIG. 8 is a waveform chart for explaining an example of the operation of the circuit of FIG. 7. The sync signal a supplied from the sync signal separator 5 in FIG. 1 is subjected to leading edge differentiation to obtain a signal l. When a pulse of the signal l appears, a pulse appears as the signal q to set the flip-flop 99 in FIG. 7 if the signal m, i.e., time window signal, is at a high level (hereinafter referred to as H level) at this time. As a result, the output signal t of the flip-flop 99 goes to an H level, causing the signal switching section 12 in FIG. 7 to pass the sync signal a as the modified sync signal u. The pulse that appears as the modified sync signal u is fed to the counter 20 in FIG. 7 to reset the same. As a result, the signal m goes to a low level (hereinafter referred to as L level). The signal m remains at the L level for a predetermined period T1 (which ends at an instant t1) from the appearance of the pulse as the modified sync signal u. After the lapse of the period T1, the signal m goes to the H level. Thus, the signal m serves as the time window signal. The signal n remains at the L level for a predetermined period T2 of time from the appearance of the pulse of the signal u, and after the lapse of the period T2 (which ends at an instant t2) it goes to the H level. Thus, the signal n serves as the local sync signal. When a pulse of the sync signal a appears after the appearance of the pulse of the signal u and before the pulse of the signal n while the signal m is at the L level, a pulse appears as the signal r to reset the flip-flop 99 in FIG. 7. As a result, the signal t from the flip-flop 99 goes to the L level, causing the signal switching section 12 in FIG. 7 to pass the signal n as the modified sync signal u. That is, the insertion of the pulse of the sync signal a in the modified sync signal u is inhibited, so that the pulse of the modified sync signal u does not appear. If no pulse appears as the sync signal a during the period from the appearance of the pulse of the modified sync signal u till the appearance of the pulse of the signal n, a pulse appears as the signal p, so that a pulse appears as the signal r to reset the flip-flop 99 in FIG. 7. Thus, the signal t from the flip-flop 99 goes to the L level, causing the signal switching section 12 in FIG. 7 to pass the pulse of the signal n as the modified sync signal u. The pulse appearing as the modified sync signal u is also fed to the counter 20 in FIG. 7 to reset the same.

As has been described, if the interval Ta of pulses appearing as the sync signal a, meets a condition $T1 \leq Ta < T2$, the circuit shown in FIG. 7 passes the sync signal a as the modified sync signal u. If the above condition is not met, the circuit inhibits the pulse of the sync signal a and, instead, supplies the signal n, i.e., the local sync signal. Subsequently, if the time interval Tb between the pulse appearing as the modified sync signal u and the following pulse appearing as the sync signal a meets a condition $T1 \leq Tb < T2$, the circuit of FIG. 7 inserts the sync signal a in the modified sync signal u; while the condition is not met, it inserts the signal n in the modified sync signal u. Thus, the time interval Tu of pulses of the modified sync signal u supplied to the control circuit 72 in the multiplexer 7 in FIG. 1 always satisfies a condition $T1 \leq Tu < T2$. The periods T1 and T2 are set as follows. If the periods T1 and T2 are so selected as to meet conditions $T1 > (n'-1) Tv$ and $T2 < n'Tv$, where Th is the reference value of the horizontal sync signal period, Tv is the audio sampling clock signal period and n' (being an integer greater than 1) is the number of encoded audio data transmitted in one horizontal sync signal period, n' or n'−1 audio sampling signals can be obtained between individual pulses appearing in the modified sync signal u. A drop-out or a large phase jump in the horizontal sync signal in the video signal usually occurs in the neighborhood of the vertical retrace period. Therefore, even if the video encoding suspension period is slightly deviated with the switching over to the local sync signal at the time of the occurrence of a drop-out or large phase jump in the horizontal sync signal, this has no substantial adverse effect on the video reproduction. Further, in normal situation without occurrence of any drop-out or large phase jump, the fluctuations of the horizontal sync signal period are very slight and about 0.1% at the most. It will be seen that the period from the instant of switching over to the local sync signal due to a drop-out or large phase jump in the horizontal signal till the instant of switching over to the normal horizontal sync signal again, correspons to Tv/(T2−Th) lines at the most, and the retrace period mentioned above can be reduced by setting the period T1, i.e., the local sync signal period, to be equal to the maximum value in the range T2 n'Tv.

The system of FIG. 1 added with the circuit 8 operates in the same way as the prior art except that the signal provided from the sync signal switching circuit 8 is supplied to the control circuit 72 in the multiplexer 7. Thus, by setting the periods T1 and T2 such as described above, video/audio simultaneous transmission can be obtained without having substantial adverse effect on the video and without possibility of occurrence of a drop-out of the encoded audio data.

Figure 9:
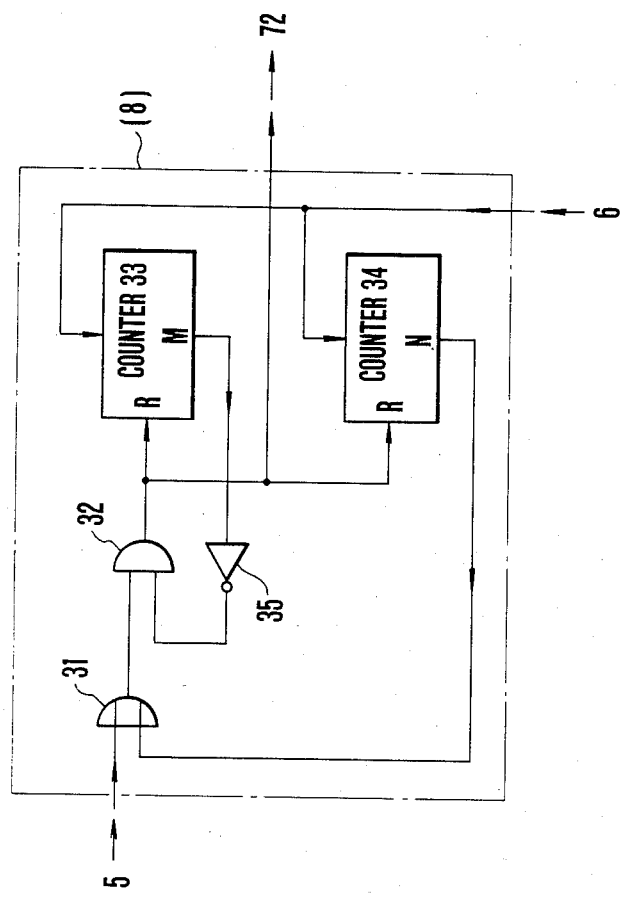
FIG. 9 shows another embodiment of the sync signal switching circuit.

FIG. 9 is a modification of the sync signal switching circuit 8. In FIG. 9, the sync signal a supplied from the sync signal separator 5 is fed to one input terminal of an OR gate 31. Counters 33 and 34 count pulses of the clock signal supplied from the clock generator 6 and produce the time window signal and local sync signal respectively. More particularly, the counter 33 produces the time window signal, which is at the H level while the count is less than a predetermined small value M and goes to the L level when the count exceeds the value M. The counter 34 produces a local sync signal pulse, which goes to the H level when the count reaches a value N greater than the value M. The local sync signal is supplied to the other input terminal of the OR gate 31, and the output signal of the OR gate 31 is fed to one input terminal of an AND gate 32. The time window signal is passed through a "not" gate 35 to be fed to the other input terminal of the AND gate 32. The output signal from the AND gate 32 is supplied to the control circuit 72 in the multiplexer 7 in FIG. 1, and also it is fed to the counters 33 and 34 to reset these counters. During the period T1 from the instant when the counter 33 is reset by the pulse supplied to the control circuit 72 till the instant when the count of the counter 33 reaches M, the signal supplied from the "not" gate 35 to the AND gate 32 is at the L level. Therefore, during this period any sync signal pulse is not passed through the AND gate 32, that is, the transmission of the sync signal is inhibited. During the period (T2−T1) from the instant after the lapse of the period T1 of resetting of the counters 33 and 34 till the instant when the count of the counter 34 reaches N, the signal supplied from the "not" gate 35 to the AND gate 32 is at the H level. Thus, a sync signal pulse appearing during this period is passed through the AND gate 32 to be fed to the control circuit 72, while also resetting the counters 33 and 34. Further, if no sync signal pulse appears during the period T2 from the instant of resetting of the counter 34 till the instant when the count reaches N, the local sync signal pulse output of the counter 34 is passed through the AND gates 31 and 32 to the control circuit 72, while also the counters 33 and 34 are rest. With the circuit of FIG. 9 used as the sync signal switching circuit 8 in the system of FIG. 1, the same operation as in the FIG. 7 arrangement thus can be obtained.

As has been described in the foregoing, with the video/audio simultaneous transmission system accoding to the invention, it is possible to effect simultaneous transmission of audio signals stably and accurately without need of greatly increasing the scale and complexity of hardware even in a case of a video signal subject to a drop-out or a large phase jump in the horizontal sync signal by allowing a local sync signal to be used when the instant of appearance of the horizontal sync signal deviates from a predetermined time range. Further, the "off" state of the video signal can be detected by counting local sync signal pulses for a predetermined period of time, so that it is possible to dispense with the conventional video "off" detection circuit and reduce the scale of the hardware.

What is claimed is:

1. A video/audio simultaneous transmission system comprising:
    means for sampling and encoding a video signal inclusive of horizontal sync signals occurring at indefinite time intervals in response to a first clock signal having a recurrence period independent of the recurrence period of the horizontal sync signal;
    means for sampling and encoding an audio signal in response to a second clock signal having a predetermined recurrence period;
    means for generating a sync signal in response to the horizontal sync signal;
    means for modifying the sync signal to produce a modified sync signal on the basis of said first clock signal; and
    means responsive to a third clock signal each time it receives the modified sync signal, for transmitting a special code different from the codes of the encoded audio and video signal data and thereafter the encoded audio and video signals successively.

2. A video/audio simultaneous transmission system according to claim 1 wherein said modifying means comprises:
    means for inhibiting insertion of a sync signal in the modified sync signal when the sync signal occurs before a first instant following lapse of a first predetermined period of time from an instant of occurrence of an immediately preceding sync signal;
    means for permitting insertion of a sync signal in the modified sync signal when the sync signal occurs before a second instant following lapse of a second predetermined period of time from the first instant; and
    means for permitting insertion of a local sync signal in the modified sync signal at the second instant when the sync signal does not occur during the period between the first instant and the second instant.

3. A video/audio simultaneous transmission system according to claim 2 comprising:
    signal generating means counting said first clock, for generating a time window signal and the local sync signal, said time window signal defining the first predetermined period of time;

signal switching means for switching the sync signal and the local sync signal to provide the modified sync signal, said modified sync signal being returned to said signal generating means to reset the same; and means responsive to the sync signal, the local sync signal and the time window signal, for controlling the switching of said signal switching means.

* * * * *

UNITED STATES PATENT AND TRADEMARK OFFICE
CERTIFICATE OF CORRECTION

Page 1 of 9

PATENT NO. : 4,542,406
DATED : 9/17/85
INVENTOR(S) : SHIMOYAMA ET AL.

It is certified that error appears in the above-identified patent and that said Letters Patent is hereby corrected as shown below:

| COLUMN | LINE | DESCRIPTION |
|---|---|---|
| 2 | 66 | delete "f" insert --$\underline{f}$-- |
| 3 | 3 | delete "h" insert --$\underline{h}$-- |
| 3 | 7 | delete "a" insert --$\underline{a}$--, first occurrence. |
| 3 | 9 | delete "u" insert --$\underline{u}$-- |
| 3 | 19 | delete "a" insert --$\underline{a}$-- |
| 3 | 21 | delete "a" insert --$\underline{a}$-- |
| 3 | 22 | delete "u" insert --$\underline{u}$-- |
| 3 | 23 | delete "d" insert --$\underline{d}$-- |
| 3 | 25 | delete "b" insert --$\underline{b}$-- |
| 3 | 29 | delete "d" insert --$\underline{d}$-- |
| 3 | 34 | delete "d" insert --$\underline{d}$-- |
| 3 | 35 | delete "g" insert --$\underline{g}$-- |

UNITED STATES PATENT AND TRADEMARK OFFICE
CERTIFICATE OF CORRECTION

PATENT NO. : 4,542,406
DATED : 9/17/85
INVENTOR(S) : SHIMOYAMA ET AL.

It is certified that error appears in the above-identified patent and that said Letters Patent is hereby corrected as shown below:

| COLUMN | LINE | DESCRIPTION |
|---|---|---|
| 3 | 36 | delete "d" insert --$\underline{d}$-- |
| 3 | 37 | delete "h" insert --$\underline{h}$-- |
| 3 | 38 | delete "g" insert --$\underline{g}$-- |
| 3 | 39 | delete "h" insert --$\underline{h}$-- |
| 3 | 40 | delete "e" insert --$\underline{e}$-- |
| 3 | 47 | delete "k" insert --$\underline{k}$-- |
| 3 | 48 | delete "k" insert --$\underline{k}$-- |
| 3 | 58 | delete "a " between "signal" and "rises" insert --$\underline{a}$-- |
| 3 | 61 | delete "a" insert --$\underline{a}$-- |
| 3 | 62 | delete "b" insert --$\underline{b}$-- |
| 3 | 65 | delete "d" insert --$\underline{d}$-- |
| 3 | 68 | delete "c" insert --$\underline{c}$-- |

UNITED STATES PATENT AND TRADEMARK OFFICE
CERTIFICATE OF CORRECTION

PATENT NO. : 4,542,406

DATED : 9/17/85

INVENTOR(S) : SHIMOYAMA ET AL.

It is certified that error appears in the above-identified patent and that said Letters Patent is hereby corrected as shown below:

| COLUMN | LINE | DESCRIPTION |
|---|---|---|
| 4 | 2 | delete"d" Insert --$\underline{d}$-- |
| 4 | 3 | delete"e" insert --$\underline{e}$-- |
| 4 | 4 | delete"b""c""d" insert--$\underline{b}$-- --$\underline{c}$-- --$\underline{d}$-- |
| 4 | 9 | delete"d" insert --$\underline{d}$-- |
| 4 | 10 | delete"f" insert --$\underline{f}$-- |
| 4 | 12 | delete"d" insert --$\underline{d}$-- |
| 4 | 13 | delete"d" insert --$\underline{d}$-- |
| 4 | 14 | delete"g" insert --$\underline{g}$-- |
| 4 | 21 | delete"d" insert --$\underline{d}$-- |
| 4 | 22 | delete"h" insert --$\underline{h}$-- |
| 4 | 23 | delete"d" insert --$\underline{d}$-- |
| 4 | 25 | delete"b" insert --$\underline{b}$-- |

UNITED STATES PATENT AND TRADEMARK OFFICE
CERTIFICATE OF CORRECTION

PATENT NO. : 4,542,406

DATED : 9/17/85

INVENTOR(S) : SHIMOYAMA

It is certified that error appears in the above-identified patent and that said Letters Patent is hereby corrected as shown below:

| COLUMN | LINE | DESCRIPTION |
|--------|------|-------------|
| 4 | 25 | delete "c" insert --$c$-- |
| 4 | 25 | delete "e" insert --$e$-- |
| 4 | 26 | delete "k" insert --$k$-- |
| 4 | 30 | delete "k" insert --$k$-- |
| 4 | 40 | delete "a" insert --$a$-- |
| 4 | 43 | delete "b" insert --$b$-- |
| 4 | 45 | delete "d" insert --$d$-- |
| 4 | 53 | delete "f" insert --$f$-- |
| 4 | 58 | delete "d" insert --$d$-- |
| 5 | 13 | delete "h" insert --$h$-- |
| 5 | 15 | delete "b" insert --$b$-- |
| 5 | 18 | delete "b" insert --$b$-- |

UNITED STATES PATENT AND TRADEMARK OFFICE
CERTIFICATE OF CORRECTION

PATENT NO. : 4,542,406

DATED : 9/17/85

INVENTOR(S) : SHIMOYAMA ET AL.

It is certified that error appears in the above-identified patent and that said Letters Patent is hereby corrected as shown below:

| COLUMN | LINE | DESCRIPTION |
|---|---|---|
| 5 | 18 | delete "d" INSERT --$\underline{d}$-- |
| 5 | 20 | delete "g" INSERT --$\underline{g}$-- |
| 5 | 28 | delete "a" INSERT --$\underline{a}$-- |
| 5 | 33 | delete "a" INSERT --$\underline{a}$-- |
| 5 | 35 | delete "u" INSERT --$\underline{u}$-- |
| 5 | 39 | delete "a" insert --$\underline{a}$-- |
| 5 | 42 | delete "e" insert --$\underline{e}$-- |
| 5 | 43 | delete "a" insert --$\underline{a}$-- |
| 5 | 56 | delete "n" insert --$\underline{n}$-- |
| 5 | 53 | delete"m,n"insert --$\underline{m}$-- --$\underline{n}$-- |
| 5 | 54 | delete "m" insert --$\underline{m}$-- |
| 5 | 52 | delete "m" "n" insert --$\underline{m}$-- --$\underline{n}$-- |

UNITED STATES PATENT AND TRADEMARK OFFICE
CERTIFICATE OF CORRECTION

PATENT NO. : 4,542,406
DATED : 9/17/85
INVENTOR(S) : SHIMOYAMA ET AL.

It is certified that error appears in the above-identified patent and that said Letters Patent is hereby corrected as shown below:

| COLUMN | LINE | DESCRIPTION |
|---|---|---|
| 5 | 59 | delete"p" "g" insert --p-- --g-- |
| 5 | 63 | delete"r" "t" insert --r-- --t-- |
| 5 | 65 | delete"a" "n" insert --a-- --n-- |
| 5 | 66 | delete"t" "a" "n" insert --t-- --a-- --n-- |
| 5 | 67 | delete"u" insert --u-- |
| 6 | 2 | delete"u" Insert --u-- |
| 6 | 5 | delete"a" insert --a-- |
| 6 | 7 | delete"l" "l" insert --l-- --l-- |
| 6 | 8 | delete"g" insert --g-- |
| 6 | 9 | delete"m" insert --m-- |
| 6 | 11 | delete"t" insert --t-- |
| 6 | 13 | delete"a" "u" insert --a-- --u-- |

UNITED STATES PATENT AND TRADEMARK OFFICE
CERTIFICATE OF CORRECTION

PATENT NO. : 4,542,406

DATED : 9/17/85

INVENTOR(S) : SHIMOYAMA ET AL.

It is certified that error appears in the above-identified patent and that said Letters Patent is hereby corrected as shown below:

| COLUMN | LINE | DESCRIPTION |
|--------|------|-------------|
| 6 | 14 | delete "u" insert --$\underline{u}$-- |
| 6 | 16 | delete "m" insert --$\underline{m}$-- |
| 6 | 17 | delete "m" insert --$\underline{m}$-- |
| 6 | 20 | delete "u" insert --$\underline{u}$-- |
| 6 | 21 | delete "m" "n" insert --$\underline{m}$-- --$\underline{n}$-- |
| 6 | 22 | delete "n" insert --$\underline{n}$-- |
| 6 | 24 | delete "u" insert --$\underline{u}$-- |
| 6 | 26 | delete "n" insert --$\underline{n}$-- |
| 6 | 27 | delete "a" insert --$\underline{a}$-- |
| 6 | 28 | delete "u" insert --$\underline{u}$-- |
| 6 | 29 | delete "n" "m" insert --$\underline{n}$-- --$\underline{m}$-- |
| 6 | 30 | delete "r" insert --$\underline{r}$-- |

UNITED STATES PATENT AND TRADEMARK OFFICE
CERTIFICATE OF CORRECTION

PATENT NO. : 4,542,406

DATED : 9/17/85

INVENTOR(S) : SHIMOYAMA ET AL.

It is certified that error appears in the above-identified patent and that said Letters Patent is hereby corrected as shown below:

| COLUMN | LINE | DESCRIPTION |
|---|---|---|
| 6 | 31 | delete "t" insert --t-- |
| 6 | 33 | delete "n" insert --n-- |
| 6 | 34 | delete "u" insert --u-- |
| 6 | 35 | delete "a" "u" insert --a-- --u-- |
| 6 | 36 | delete "u" insert --u-- |
| 6 | 37 | delete "a" insert --a-- |
| 6 | 39 | delete "u" insert --u-- |
| 6 | 40 | delete "n" "p" insert --n-- --p-- |
| 6 | 41 | delete "r" insert --r-- |
| 6 | 42 | delete "t" insert --t-- |
| 6 | 44 | delete "n" insert --n-- |
| 6 | 45 | delete "u" insert --u-- |

UNITED STATES PATENT AND TRADEMARK OFFICE
CERTIFICATE OF CORRECTION

PATENT NO. : 4,542,406

DATED : 9/17/85

INVENTOR(S) : SHIMOYAMA ET AL.

It is certified that error appears in the above-identified patent and that said Letters Patent is hereby corrected as shown below:

| COLUMN | LINE | DESCRIPTION |
|--------|------|-------------|
| 6 | 46 | delete "u" insert --u-- |
| 6 | 49 | delete "a" insert --a--- , first occurrence. |
| 6 | 51 | delete "a" "u" insert --a-- --u-- |
| 6 | 53 | delete "a" "n" insert --a-- --n-- |
| 6 | 56 | delete "u" "a" insert --u-- --a-- |
| 6 | 58 | delete "a" "u" insert --a-- --u-- |
| 6 | 59 | delete "n" insert --n-- |
| 6 | 60 | delete "u" insert --u-- |
| 6 | 61 | delete "u" insert --u-- |
| 7 | 4 | delete "u" insert --u-- |
| 7 | 35 | delete "a" insert --a-- |

Signed and Sealed this

Sixteenth Day of August, 1988

Attest:

DONALD J. QUIGG

Attesting Officer

Commissioner of Patents and Trademarks